Jan. 8, 1952　　　W. DE BACK ET AL　　　2,581,785
PEACH PITTING HEAD
Filed Sept. 24, 1946　　　　　　　　　　3 Sheets-Sheet 1
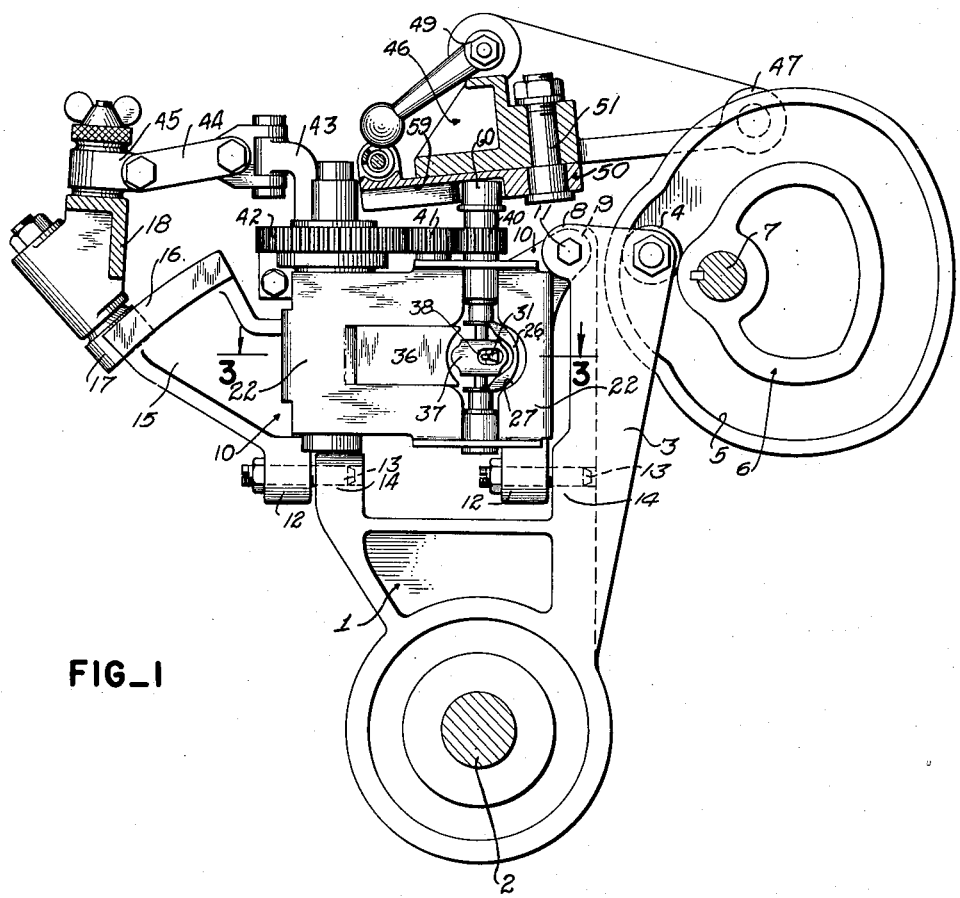
FIG_1
Inventors
WILLIAM DE BACK
FREDERICK H. LUHDORFF Jan. 8, 1952     W. DE BACK ET AL     2,581,785
PEACH PITTING HEAD
Filed Sept. 24, 1946     3 Sheets-Sheet 2
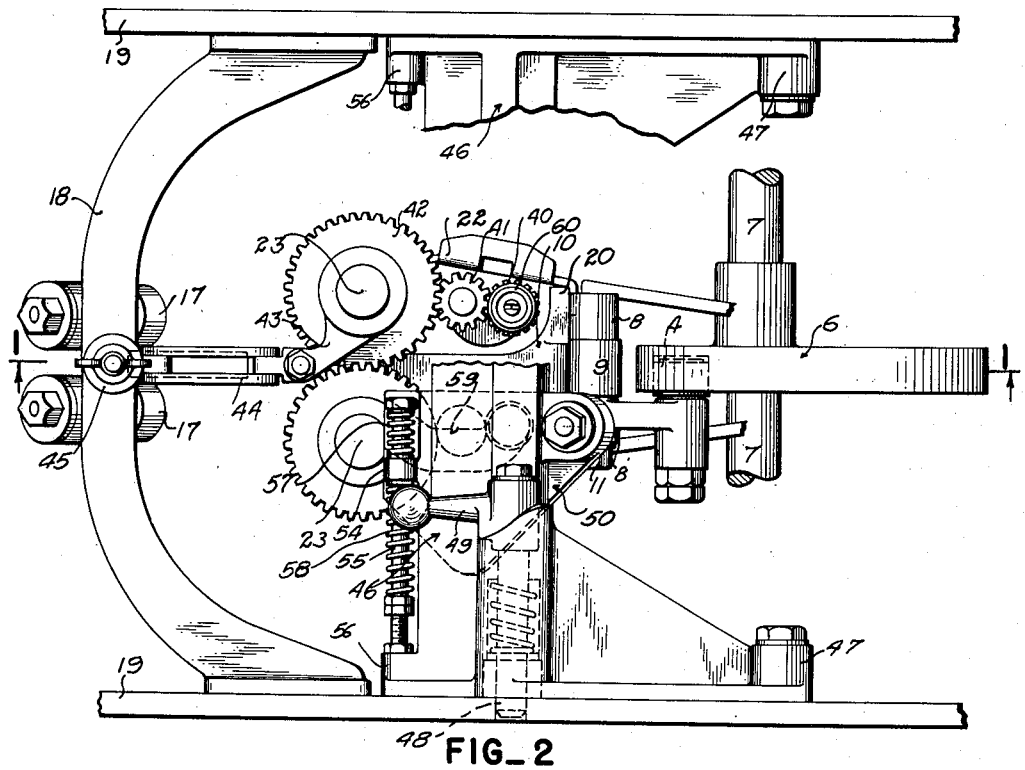
FIG_2
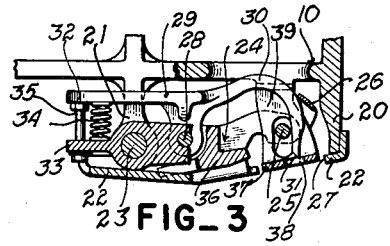
FIG_3
FIG_4
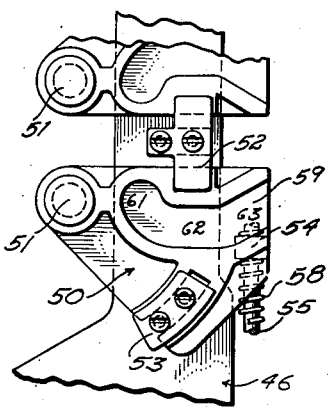
FIG_5
FIG_6
Inventors
WILLIAM DE BACK
FREDERICK H. LUHDORFF
By Lyon & Lyon
Attorneys Jan. 8, 1952　　　W. DE BACK ET AL　　　2,581,785
PEACH PITTING HEAD
Filed Sept. 24, 1946　　　　　　　　　　3 Sheets-Sheet 3
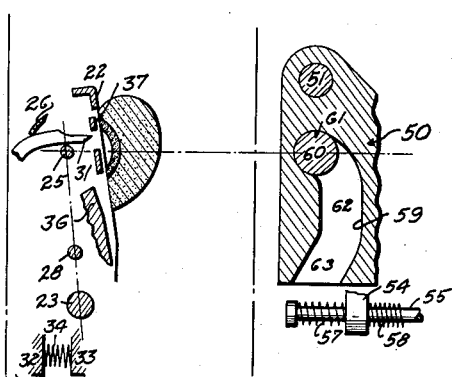
FIG_7
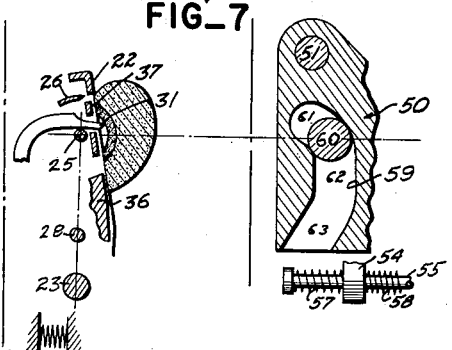
FIG_8
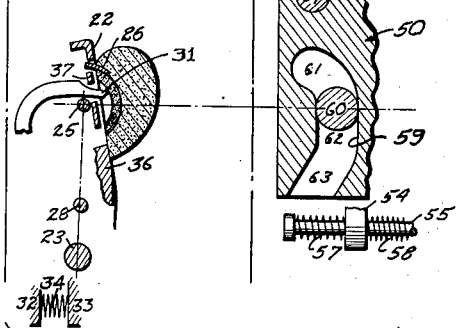
FIG_9
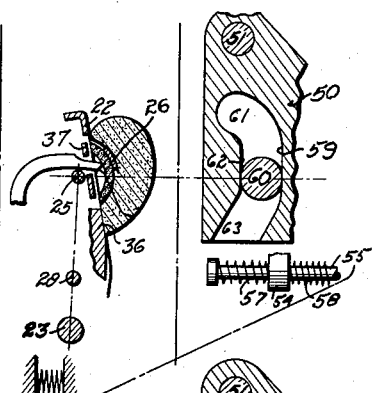
FIG_10
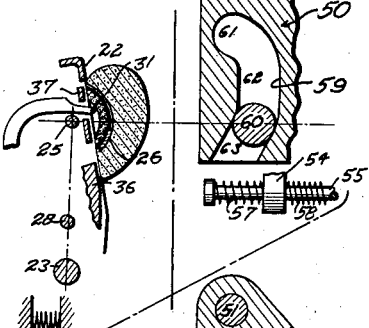
FIG_11
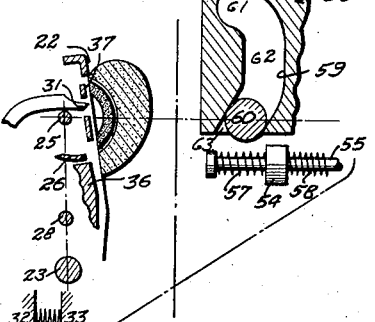
FIG_12
Inventors
WILLIAM DE BACK
FREDERICK H. LUHDORFF
By Lyon & Lyon
Attorneys Patented Jan. 8, 1952

2,581,785

UNITED STATES PATENT OFFICE 2,581,785

PEACH PITTING HEAD

William de Back and Frederick H. Luhdorff, San Jose, Calif., assignors to Pacific Machinery Company, San Francisco, Calif., a corporation of California Application September 24, 1946, Serial No. 698,998

6 Claims. (Cl. 146—28)

Our invention relates to peach pitting heads, more particularly to peach pitting heads for use in continuous operating type of peach pitting machine as distinguished from the intermittently operated type.

An object of this invention is to provide a peach pitting head which is intended for use in the continuous peach pitter disclosed in Patent 2,376,526 issued May 22, 1945 to Albert R. Thompson, the construction and arrangement being such that our peach pitting head may be substituted for the head forming a part of said previous structure without substantially altering the other part of the apparatus.

A further object is to provide a peach pitting head which utilizes many of the features found advantageous in the above identified patent such as the oscillating pitting knife and the pit finder arranged to limit depth of cut of the pitting knife; but which incorporates additional features wherein the cutting action is not only more precise, but also more adaptable to the wide variety of size and shape of peach and peach pit which a machine of this type is required to handle.

Another object is to provide a peach pitting head which is particularly designed for the pitting of clingstone peaches and which incorporates novel means for controlling the course of the pitting knife around the peach pit so that, although the size and location of the peach pit may vary, the knife follows closely the contour of the peach pit.

Another object is to provide a dual peach pitting head which pits simultaneously both halves of a peach which has been previously sliced and its pit divided, the pitting operation of each half of peach, however, being independent so that even though the peach should be improperly divided in a manner to dispose a major part of a peach pit on one side, the pitting knives make a shallow or deep cut in accordance with the depth occupied by the portion of the pit contained in the peach half.

With the above and other objects in view as may appear hereinafter, reference is directed to the accompanying drawings in which:

Fig. 1 is a side elevational view of our peach pitting head shown in position in a peach pitting machine; the peach pitting machine being shown in section taken substantially along the line 1—1 of Fig. 2.

Fig. 2 is a top or plan view of our peach pitting head with a portion of the bridge which supports one of the pitting knife control cams being broken away to facilitate the illustration.

Fig. 3 is a fragmentary sectional view of the peach pitting head taken through 3—3 of Fig. 1.

Fig. 4 is a fragmentary elevational view of the peach pitting head viewed from the same direction as Fig. 1, but with the fruit contact plate removed and with the pit guard shown in section.

Fig. 5 is a fragmentary bottom view of the pitting knife control cams and their supporting bridge.

Fig. 6 is an enlarged end view of one of the peach pitting knives.

Figs. 7 to 12, inclusive, are a series of diagrammatical views illustrating the manner in which the pit finder, pitting knife, and pitting knife control cam cooperate in the process of pitting a peach.

As stated hereinbefore, our peach pitting head is particularly designed for incorporation in the peach pitting machine shown in the Thompson Patent 2,376,526 and, therefore, utilizes the means shown in said patent employed to feed the peaches into and through suitable slicing and sawing devices. The peaches are fed progressively past our peach pitting head in much the same manner as in the above mentioned patent.

Our peach pitting head is mounted on a cradle 1 which is secured to a shaft 2 forming a part of the peach pitting machine. The cradle 1 includes an upwardly directed arm 3, the upper forward extremity of which is provided with a horizontally disposed cam follower roller 4. The roller 4 coacts with a camway 5 provided in a cam 6 mounted on a shaft 7. As disclosed more fully in the above mentioned patent, the cam 6 is employed to oscillate the cradle 1 so that the peach pitting mechanism, to be described hereinafter, may be caused to move in unison with the halved peaches as they travel rearwardly from the peach halving mechanism.

Rearwardly of the roller 4 the arm 3 is divided longitudinally to form a pair of spaced bosses 8 between which extends an ear 9 of a pitting head frame 10. A bolt 11 secures the ear 9 between the bosses.

The pitting head frame 10 is provided with a pair of depending bosses 12 from which extend forwardly directed pin 13 adapted to fit in bushings 14 forming a part of the cradle 1. It will thus be seen that the pitting head frame is readily removably connected by three point support to the cradle 1.

As will be brought out hereinafter, the pitting head structure may be readily and quickly interchanged in the event of damage to the pitting knives or other parts of the head. This interchangeable arrangement is not, however, a part of the present invention, but may be made the subject of another patent application.

Extending rearwardly and upwardly from the pitting head frame 10 is a track arm 15 which terminates in an arcuate track 16 having its center of curvature coinciding with the center of the shaft 2. The track 16 is engaged in opposite sides by rollers 17 supported by a frame 18 which in turn is rigidly attached to the side plates 19 of the peach pitting machine.

The forward end of the pitting head frame 10 its provided with a laterally directed cross member 20. Spaced rearwardly therefrom, the pitting head frame is provided with a pair of laterally disposed journals 21 having vertical bores. Supported between the cross member 20 and the journals 21 on opposite sides of the pitting head frame 10 are fruit contact plates 22 over which the severed halves of the peaches progress rearwardly. During the pitting operation, however, the pitting head and peach halves move in unison; that is, without relative movement.

The vertical bores of the journals 21 receive shafts 23 Each shaft journals or oscillatably supports a pitting knife lever 24 which is essentially H-shaped, that is, each end is bifurcated to form upper and lower arms connected by a web. Each lever 24 extends forwardly between the pitting head frame 10 and the corresponding fruit contact plate 22. The bifurcated forward extremity of the lever 24 journals a pitting knife shaft 25, the axis of which is vertical. A U-shaped or open loop knife 26 is secured by its legs to the shaft 25 so that the curved portion of the knife may be oscillated in an arc. The fruit contact plate 22 is provided with a port or aperture 27 of sufficient dimensions to clear the knife when the knife is moved in an arcuate path outwardly through the fruit contact plate, as will be brought out hereinafter.

The rearward bifurcated portion of the pitting knife lever 24 fits over opposite ends of the journal 21. This bifurcated end of the pitting knife lever carries with it a pit finder lever shaft 28 having a vertical axis, that is, an axis parallel to the shaft 23. The shaft 28 oscillatably supports a pit finder lever 29 which includes an arm 30 which curves forwardly and laterally outward in such a manner as to pass around and project beyond the pitting knife shaft 25 so that it may be thrust outwardly through the aperture 27. The extremity of the arm 30 is pointed, as indicated by 31.

The pit finder lever also includes an arm 32 which is offset upwardly clear of the journal 21 and extends rearwardly between the journal end of the pitting knife lever 24 and the pitting head frame 10. The extremity of the arm 32 confronts a lug 33 extending from the lever 24. Between the arm 32 and lug 33 there is interposed a spring 34 tending to force them apart. An adjustment bolt 35 draws the lug 33 and arm 32 toward each other. This relative movement varies the spacing between the pitting knife and pit finder point 31.

The rearward edge of the aperture 27 is cut away or slotted to receive a ramp plate 36 which is rigidly connected to the pitting knife lever 24 in such a manner that when the lever 24 is in its retracted position, the ramp 36 is offset inwardly from the surface of the fruit contact plate; but when the lever 24 is moved outwardly, the ramp 36 moves approximately flush with the normal surface of the fruit contact plate.

Substantially centered within the opening defined by the aperture 27 and the confronting edge of the ramp 36 is a pit supporting plate or guard 37. The plate 37 is provided with a small opening 38 through which moves the pointed end 31 of the pit finder lever 30. The pit supporting plate 37 is carried by arms 39 which are slotted to clear the shaft 25 and which continue inwardly for rigid connection to the pitting head frame 10.

Each pitting knife shaft 25 protrudes upwardly from the pitting head frame 10 and is provided with a gear 40 which meshes with an idler gear 41 carried by the pitting knife lever 24. Each idler gear 41 meshes with a drive gear 42. The two drive gears 42 mesh with each other so that the two pitting knives 26 are operated simultaneously. One of the drive gears 42 is provided with a drive lever 43 which is connected by a suitable linkage 44 to a pivot post 45 mounted on the frame 18. The several gears are so arranged that when the pitting head moves rearwardly in unison with the peach feeding mechanism and peach halves overlie the plates 22, the pitting knives are caused to rotate in a manner to make arcuate cuts around the pit halves contained in the severed peach.

It will be observed that the pitting knives must be initially retracted during movement of a peach half into position and again retracted during removal of the pitted peach half. Also it is necessary that the pitting knife follow as closely as possible the outer surface of the pit half, even though the size of the pit half may vary. This is automatically regulated by the pit finder lever which engages the kernel cavity of the peach pit and thereby controls the relative position of the pitting knife, as will be brought out hereinafter. Such control is not entirely adequate for all conditions. It has been found that the entire assembly, including the pitting knife and its shaft, and the pit finder and its shaft, must be laterally movable in order to accommodate the wide range in size and shape of peach pits but that this movement cannot be uncontrolled, instead it must be restrained. This added control will now be described.

Pivotally mounted between the side plates 19 of the peach pitting machine is a cam bridge 46. The cam bridge 46 is substantially U-shaped in plan with pivots 47 at its extremities which coact with the side plate 19 so that the cam bridge may be swung upwardly and away from the pitting head frame 10 when it is desired to service the pitting head. The cam bridge 46 is retained in contiguous relation over the pitting head frame 10 by means of latch pins 48 which are operated by latch levers 49.

Oscillatably supported under the cross portion of the cam bridge 46 is a pair of pitting knife control cams 50. Each control cam is in the form of a substantially triangular plate oscillatably supported at its forward apex by a pivot 51. In addition to the pivot 51 the two control cams 50 are held against the underside of the cam bridge by retainer plates 52 and 53.

The rearward portion of each control cam 50 is provided with a lug 54 through which extends a horizontal, laterally directed adjustment rod 55, the lateral extremities of which are adjustably mounted in a boss 56 extending rearwardly from the outer corner of the cam bridge 46. Each lug 54 is flanked by springs 57 and 58 mounted on the adjustment rod 55. By means of the springs 57 and 58 the neutral position of each control cam may be adjusted as well as the force required to move it from such neutral position may be varied.

The underside of each control cam 50 is provided with a cam slot 59 which extends generally in a longitudinal direction relative to the peach pitting machine and overlies the pitting knife shaft 25. The upper extremity of each pitting knife shaft 25 is provided with a cam roller 60 which rides in the corresponding cam slots 59.

Each cam slot 59 includes a laterally outwardly sloping initial portion 61 which curves into a rearwardly directed portion 62 and this portion in turn curves into a laterally inwardly directed portion 63.

The operation of a peach pitting head will now be described and for this purpose reference is directed particularly to the substantially diagrammatical fragmentary views, Figs. 7 to 12, inclusive. Each of these views is a composite view showing the control cam as it would appear looking downwardly thereon and showing from the same aspect the essential portions of the pitting head, particularly the pitting knife and pit finder.

With reference first to Fig. 7 the parts are shown in their initial position, that is, the cam roller 60 is in the forward extremity of the cam slot 59, the pitting knife and pit finder are retracted. As the pitting head moves forwardly to the position of Figure 8, the pitting knife and pit finder assembly rotate in unison about the shaft 23 by reason of movement of the cam roller 60 in the initial portion 61 of the cam slot. It will be observed that the pit finder engages the pit before the knife begins to penetrate the peach half. Continuing with Fig. 9, the finder has engaged the pit and the knife has started its cutting operation. Fig. 10 is a continuation of the condition existing in Fig. 9. As the pitting knife completes its cut, the cam follower or roller 60 enters the laterally inwardly directed portion 63 of the cam slot causing the entire pitting knife and pit finder assembly to pivot counterclockwise about the shaft 23 until both devices are clear of the peach.

Before the next peach is moved in position, the pitting head returns to its initial position and the various parts move backwardly through the position shown.

Under the conditions shown and described above, it has been assumed that none of the springs 34, 57, or 58 have functioned. Should the cavity in the peach pit be shallower than normal, the peach finder will not penetrate laterally as far as shown, but will be resisted by the peach pit. This causes the pitting knife to make a circular cut of lesser depth than that illustrated. Contrariwise, the knife tends to follow its normal course by reason of the control cam 50. However, this cam is capable of slight displacement by reason of its mounting between the springs 57 and 58. Therefore, under the conditions just described, spring 57 compresses slightly and spring 58 expands slightly to allow the cam slot to move to the left, as viewed in Figs. 7 to 12, allowing the knife to make the shallower cut.

It should be noted that the outer surface of the peach pit is rough and that, therefore, the cutting edge of the pitting knife must be beveled away from the peach pit rather than toward the peach pit. Such beveling of the knife has the effect under the extremely rapid conditions of operation to exert a force on the knife tending to swing it laterally outwardly so as to make a deeper cut in the peach than desired. This movement, however, is resisted by the spring 34 and spring 58. By reason of the fact that spring 58 particularly may be readily adjusted this tendency for the knife to deflect from its course may be fully counteracted.

Should the pit be extra thick or have protuberances which might be engaged by the knife, it will be seen that the manner in which the knife is beveled will permit the knife to ride over such protuberances in opposition to the springs 34 and 54.

The normal distance between the pointed end 31 of the pit finder and the guard 37 for the maximum extended position of the pitting knife is adjusted by the adjustment bolt 35.

While we have shown and described a preferred embodiment of the present invention, it will be understood that various changes may be made without departing from the spirit of the invention and the scope of the appended claims.

Having thus described our invention, what we claim as new and desire to protect by Letters Patent is:

We claim:

1. An apparatus for pitting fruit which has been previously halved, comprising: a fruit contact plate for supporting the pit side of a fruit half and including a pit support surrounded by an annular aperture, said fruit contact plate also defining a window at one side of said pit support communicating with said aperture; a pitting knife lever pivotally mounted behind said plate and including a ramp plate fitting said window and movable between a recess and flush relation with said fruit contact plate; and an oscillatable pitting knife carried by said lever and movable between a retracted position and an extended position wherein said pitting knife is adapted to be moved through a path circumscribing the pit of a fruit half overlying said aperture.

2. An apparatus for pitting fruit which has been previously halved, comprising: a fruit contact plate for supporting the pit side of a fruit half and including a pit support surrounded by an annular aperture, said fruit contact plate also defining a window at one side of said pit support communicating with said aperture; a pitting knife lever pivotally mounted behind said plate and including a ramp plate fitting said window and movable between a recess and flush relation with said fruit contact plate; an oscillatable pitting knife carried by said lever and movable between a retracted position and an extended position wherein said pitting knife is adapted to be moved through a path circumscribing the pit of a fruit half overlying said aperture; means yieldably carried by said lever and engageable with said fruit pit to limit outward movement of said lever thereby to limit the depth of cut of said pitting knife; means for controlling the movement of said lever to shift said pitting knife between its retracted and extended positions; and a yieldable mounting for said control means responsive to forces exerted on said pitting knife to vary the extended position thereof.

3. A fruit pitting head movable relative to a supporting frame, comprising: a fruit contact plate defining an aperture adapted to be covered by a fruit half with its pit exposed thereto; a pivotally supported lever behind said plate; a pitting knife oscillatably carried by said lever and movable thereby between retracted and extended positions; a cam follower also carried by said lever spaced from the pivot thereof; a cam carried by said frame and disposed for coaction with said cam follower to shift said pitting knife between its retracted and extended positions upon movement of said head; and a yieldable mounting means tending to hold said cam in a preselected position but permitting displacement to either side of said position in response to forces acting on said pitting knife lever; said pitting knife adapted, when in its extended position to cut a path circumscribing said fruit pit.

4. A fruit pitting head movable relative to a supporting frame, comprising: a fruit contact plate defining an aperture adapted to be covered by a fruit half with its pit exposed thereto; a pivotally supported lever behind said plate; a pitting knife oscillatably carried by said lever and movable thereby between retracted and extended positions; a cam follower also carried by said lever spaced from the pivot thereof; a cam carried by said frame and disposed for coaction with said cam follower to shift said pitting knife between its retracted and extended positions upon movement of said head; a yieldable mounting means tending to hold said cam in a preselected position but permitting displacement to either side of said position in response to forces acting on said pitting knife lever; said pitting knife adapted, when in its extended position to cut a path circumscribing said fruit pit; and a pit finder carried by and yieldably connected with said pitting knife lever and engageable with said fruit pit to limit movement of said pitting knife toward its extended position; said yieldable mounting means and the yieldable connection between said pit finder and lever, coacting to determine a resultant circumscribing course for said pitting knife in close proximity to said fruit pit.

5. In a fruit pitting head for fruit pitting machines wherein the halved fruit is progressed past the pitting head, the combination of: a pitting knife adapted to rotate in an arcuate path approximating the surface of the pit of a fruit half overlying said knife; a pit finder adapted to engage said pit and yieldably connected with said pitting knife to exert a force tending to limit the depth of cut made thereby; carrier means including a journal for pivoting said pitting knife and pit finder as a unit between a retracted and an extended position; a cam follower carried by said carrier means spaced from said journal; cam means mounted on means movable relative to said head, said cam follower engaging said cam and shaped to move said pitting knife and pit finder unit about said journal between a retracted and an extended position in response to said relative movement; and yieldable mounting means for mounting said cam means on said movable means permitting displacement thereof when said pit finder is restrained by engagement with a fruit pit, and said cam follower is thereby restrained, and separate means for simultaneously moving said knife along said arcuate path.

6. In an apparatus for pitting halved fruit having means for continuously moving fruit halves relative to said frame along a predetermined path; a frame, a pitting head cyclically movable along said path in unison with successive fruit halves, said head including means having a surface for engaging the cut face of a fruit half, a pitting knife mounted on the head for oscillation through said surface about an axis generally parallel to said surface, a shaft defining said axis, actuating linkage connecting said frame and shaft for moving said shaft toward and from said surface in response to predetermined movements of said pitting head along said path, and a separate drive means for oscillating said knife about said axis in response to further movements of said head, said actuating linkage including resiliently yieldable elements whereby said shaft is yieldably urged to and held in predetermined locations relative to said surface.

WILLIAM DE BACK.
FREDERICK H. LUHDORFF.

REFERENCES CITED

The following references are of record in the file of this patent:

UNITED STATES PATENTS

| Number | Name | Date |
|---|---|---|
| 2,066,567 | Jepson | Jan. 5, 1937 |
| 2,376,526 | Thompson | May 22, 1945 |
| 2,380,530 | Jepson | July 31, 1945 |